Figure 1:
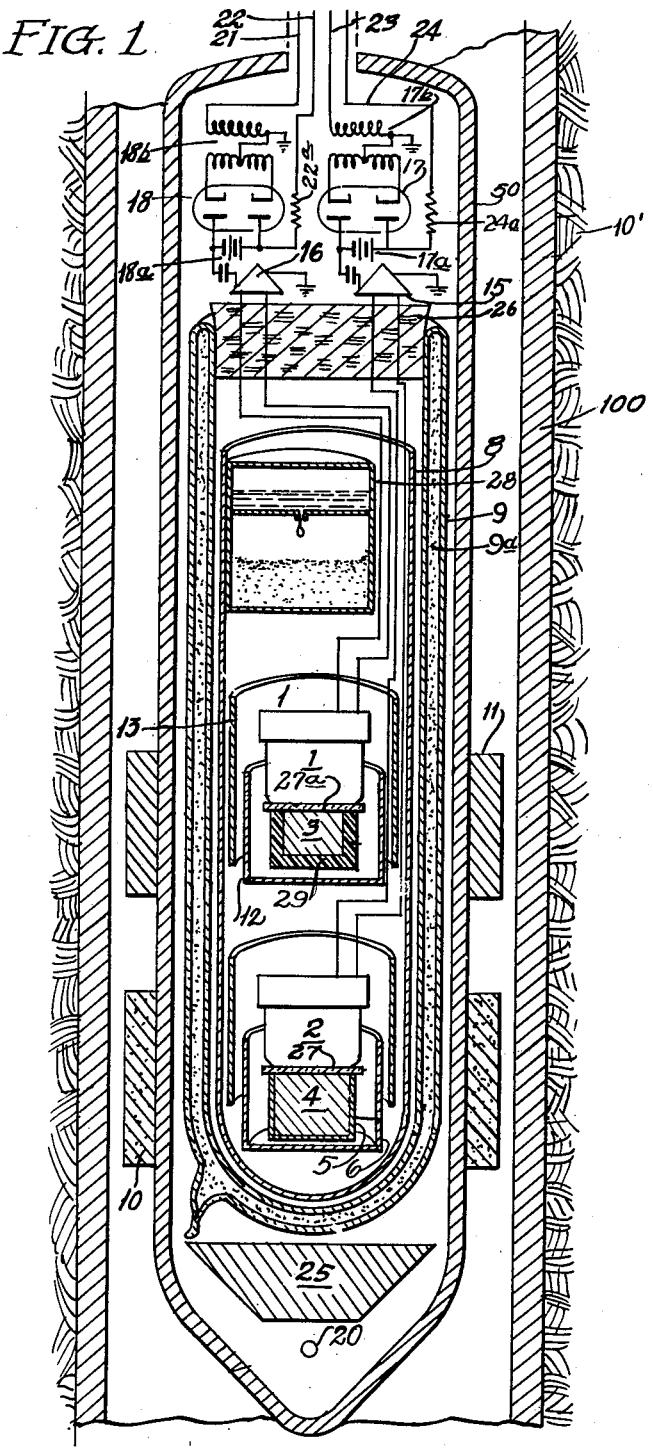

March 5, 1963  S. A. SCHERBATSKOY  3,080,480
APPARATUS FOR DEEP-WELL LOGGING
Original Filed July 7, 1955  2 Sheets-Sheet 2
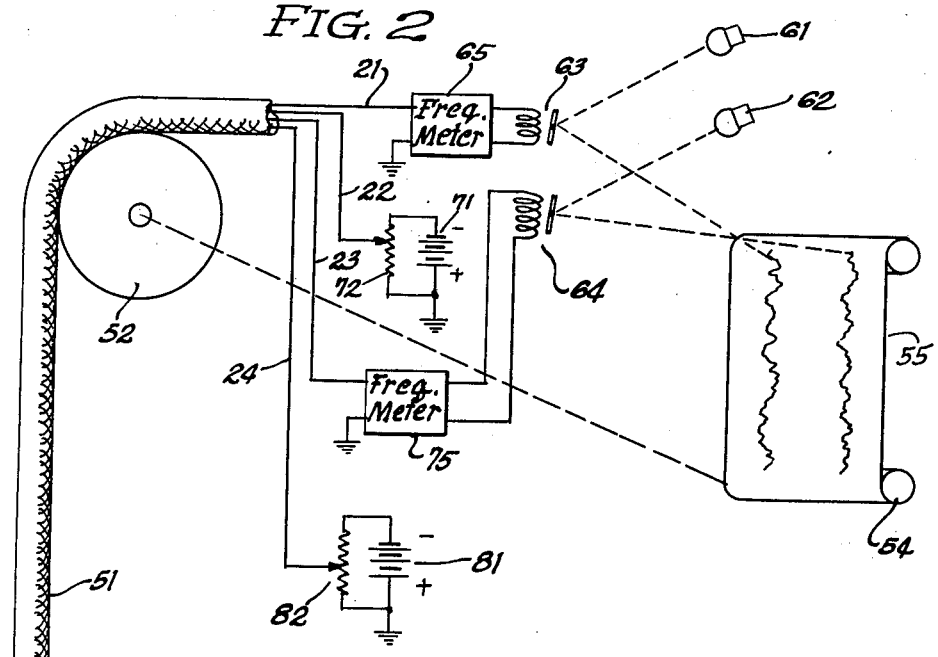
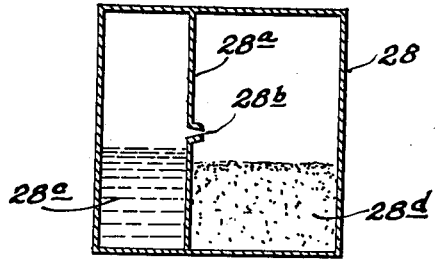
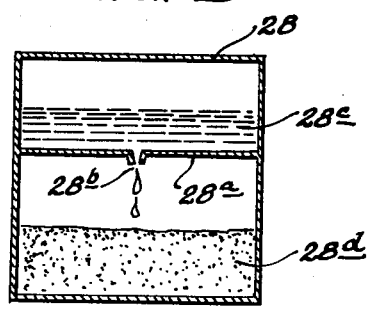

United States Patent Office 3,080,480
Patented Mar. 5, 1963

3,080,480
APPARATUS FOR DEEP-WELL LOGGING
Serge A. Scherbatskoy, 804 Wright Bldg., Tulsa 3, Okla.
Original application July 7, 1955, Ser. No. 520,478, now Patent No. 2,862,106, dated Nov. 25, 1958. Divided and this application Oct. 14, 1958, Ser. No. 767,216
9 Claims. (Cl. 250—83.3)

This invention relates to the field of bore-hole logging by radiant energy, and is particularly addressed to logging apparatus adapted to be received within a bore hole and having spectrally selective radiation-detecting apparatus therein, the selectivity of which is controllable from the earth's surface during a subterranean logging operation.

This application is a division of my copending application Serial No. 520,478, filed July 7, 1955, now matured into U.S. Patent No. 2,862,106.

Radiant-energy bore-hole logging involves lowering a radiation detector into a bore hole and recording as a function of depth the relative intensity of radiation impinging on the detector at different depths from the geological formations surrounding the bore hole. Radiation thus impinging on the detector from the formations may be entirely the result of natural radioactivity or it may be partially the result of radioactivity induced by artificial bombardment of the formations with nuclear particles such as neutrons. A log produced by detection of neutron-induced radioactivity is known in the art as a "neutron-neutron" log or a "neutron-gamma ray" log depending on whether the radiation detected and recorded consists of scattered neutrons returned to the detector from the formations or gamma rays produced in the formations as the result of interactions between neutrons and the atoms in the formations.

In many logging applications, spectral selectivity of detected radiations is highly desirable. For example, one may desire particularly to measure the intensity of gamma radiation lying within a specific energy range, in order to determine the relative abundance at various depths of a specific element having the characteristic of emitting gamma rays in such energy range.

Moreover, to gain maximum information during a single logging run, one may desire to measure, simultaneously or in quick succession, the intensities of radiation lying within a plurality of specific energy ranges.

In the present invention, I have provided a logging apparatus wherein the logging unit is provided with radiation-detecting means having spectral selectivity, such selectivity being in my invention controllable from the surface of the earth during a logging operation.

With my apparatus, it is thus possible, at successive depths, to measure in quick succession the intensities of radiation components in a plurality of different predetermined energy ranges, thus achieving a vastly more informative and versatile log than has heretofore been possible.

To provide logging apparatus having spectral selectivity controllable from the earth's surface while the logging unit is in a bore hole is the primary object of the present invention.

As above suggested, my invention, in the achievement of the aforementioned primary object, also makes possible important secondary objects. Thus, with my invention, simultaneous logs can be run which indicate the relative intensities of radiation lying in a plurality of discrete energy ranges, thus permitting determination, on a single logging run, of the relative abundance of several different elements at various formation depths.

Persons skilled in the bore-hole-logging art will realize that having a logging instrument whose spectral selectivity is controllable from the surface during a subterranean logging operation greatly increases the versatility of the equipment, in that it permits logs of different types to be run in different parts of the bore hole without requiring the apparatus to be pulled to the surface and readjusted or replaced with a different logging unit. Achievement of such versatility of operation is another important object of the present invention.

In the present specification, I have described my invention in connection with an illustrative application, wherein the invention is incorporated in a logging unit containing both a gamma-ray detector and a neutron detector, in combination with appropriate equipment to facilitate the detection of connate water.

Connate water invariably contains dissolved sodium chloride in substantial quantities. Chlorine possesses a large neutron-capture cross section, and has the characteristic, upon capturing neutrons, of emitting high-energy gamma rays of capture, having energies in the neighborhood of 7 mev. Hence the presence of connate water in the formation surrounding a bore hole can be detected by selectively logging gamma rays from the formations in the 7 mev. energy range.

It is desirable that such neutron-gamma ray logging be accompanied by a neutron-neutron log, since the presence of sodium and chlorine in the surrounding formations will usually be revealed by a distinct drop in the number of returned neutrons. Thus the data provided by the neutron-gamma ray log can be checked by reference to the neutron-neutron log. When a marked increase in the intensity of gamma rays in the 7 mev. region is accompanied by a reduction in the slow-neutron field, the presence of connate water in the surrounding formations is strongly indicated.

In the appended drawing, FIGURE 1 is a diagrammatic sectional view, taken in the vertical plane of a radiation detector embodying the principles of my invention, some of the drawing being schematic in character. FIG. 2 is a diagrammatic showing of a typical surface installation for use in connection with the radiation detector of my invention. FIGS. 3 and 4 are sectional views showing a cooling unit which may form a part of my invention, FIG. 3 showing the unit in the horizontal position which it will normally occupy when my logging apparatus is being stored, and FIG. 4 showing the same unit in the vertical position which it will normally occupy when the logging apparatus is in actual use in a bore hole.

Referring now to FIG. 1, I have indicated therein a bore hole having a metal casing 100 and surrounding formations 101. My logging unit is carried within a rugged external casing 50, which may be made of steel and which is generally cylindrical in shape, being normally quite elongated and sufficiently small in its radial dimension to be received readily within the bore hole.

Near the lowermost portion of the logging unit 50 is a neutron source 20 which will normally consist of a small vial containing a mixture of radium and beryllium. Such devices are well known in the art as neutron sources.

Disposed directly above neutron source 20 is a relatively massive shield 25 preferably made of tungsten or some heavy alloy such as the product sold commercially under the name "Hevimet." Shield 25 is intended to shield from the detecting apparatus the direct radiations from neutron source 20.

Suitably mounted within the casing 50 I provide a steel Dewar vacuum bottle 9, in the shape of an elongated cylinder, closed off at the bottom and provided at the top with a suitable stopper or cork 26. The space between the inner and outer annular walls of bottle 9 is thoroughly evacuated and filled with finely divided carbon granules 9a. This material, I have found, acts as a gas-absorbing "getter" and maintains a very high vacuum for long periods of time despite the slight porosity of the steel walls of bottle 9. Carbon 9a also has the desirable characteristic of absorbing infrared radiation between the walls of the bottle and thereby inhibiting further heat transfer from outside the bottle to the protected zone within it, while not interfering with the radiant energy which it is the function of the apparatus inside bottle 9 to detect and analyze.

The radiation-detecting apparatus is mounted within a copper inner container 8 which serves more or less as a "liner" to the vacuum bottle 9 and which serves the dual functions of protecting the equipment from stray high-frequency electromagnetic fields and at the same time maintains the temperature-sensitive elements of the apparatus at a uniform temperature.

Carried within the upper portion of copper liner 8, in physical contact with its inner wall, I provide a cooling device 28 which will be more extensively described hereinafter in connection with FIGS. 3 and 4. For the moment it will be sufficient to state that cooling device 28 functions, when my logging unit is in a bore hole, to absorb heat from the copper liner 8 and from the air within the interior of bottle 9, its effect being to maintain substantially uniform the temperature throughout the interior of bottle 9, notwithstanding a substantial rise in the ambient temperature within the bore hole as the logging instrument is lowered therein.

In the lower portion of the copper liner 8 I provide a gamma-ray detector comprising a thallium-activated sodium iodide scintillating crystal 4 and an associated photomultiplier tube 2. The crystal 4 is surrounded by an aluminum jacket 5 and an outer shield 6 made of amorphous boron powder dispersed in a plastic binder. The jacket 5 and shield 6 play an important part in the operation of my gamma-ray counter, which will be described in detail hereinafter.

Interposed between the face of crystal 4 and photomultiplier 2 is a light-diffusing element 27 made of a suitable ground glass such as the type sold commercially under the name "Vycor." Element 27 performs the important function of diffusing light flashes from crystal 4 over a large area of the cathode of the photomultiplier 2. This action averages out the differences in photo-sensitivity of various areas of the cathode and thereby insures that a given flash in crystal 4 will produce an output pulse of corresponding amplitude. Without the diffusing action of element 27, the magnitude of any given output pulse will depend not only on the brilliance of the scintillation which produced it but also on the particular part of the cathode on which the flash happens to impinge.

An annular shield 7 made of a highly permeable metal such as Permalloy is mounted so as to surround the photomultiplier unit 2, protecting the highly sensitive apparatus therein from being influenced by stray magnetic fields, particularly those associated with casing collars. Such collars, encountered in bore holes at regular intervals, constitute discontinuities in the diameter of the casing and hence produce discontinuities in the ambient magnetic field within the bore hole.

Externally of casing 50, at the position corresponding to that of the gamma-ray detector comprising crystal 4, I provide a thick annular shield 10, fitting tightly around casing 50 and having outer diameter very nearly equal to that of the bore-hole casing 100, being just sufficiently smaller to permit ready raising and lowering of the instrument within the hole. The shield 10 is preferably cast from a mixture of lead and amorphous boron powder.

Associated with photomultiplier tube 2, I provide an amplifier and power-supply unit 15 which supplies the necessary polarizing voltages for the photomultiplier tube and which greatly amplifies the power level of the output pulses therefrom. Amplifier 15 is so arranged as to provide positive output pulses responsively to flashes in crystal 4. These output pulses are applied to a gate circuit comprising a high-vacuum dual diode 17. The plates of the diode units in tube 17 are connected together through a polarizing battery 17a which has the effect of biasing one diode plate more negatively than the other. The diode plates are supplied with their principal biasing voltage from the surface via wire 24, through isolating resistor 24a.

The cathodes of diode unit 17 are connected to the respective terminals of the primary winding of a pulse transformer 17b, the center tap thereof being grounded. The secondary winding of pulse transformer 17b has one terminal connected to ground and the other terminal run to the surface via cable conductor 23.

Mounted within copper liner 8, at a position a short distance above the gamma-ray detector which comprises crystal 4, I provide a neutron detector comprising lithium iodide crystal 3 and photomultiplier 1. The lithium iodide crystal 3 is activated with europium or tin.

Interposed between lithium iodide crystal 3 and the photomultiplier tube 1 I provide a diffusing element 27a similar in structure and function to the diffusing element 27 already described with respect to crystal 4.

Closely surrounding the crystal 3, I provide a relatively thick jacket 29 made of nylon, hard rubber, polystyrene, or other suitable hydrogen-containing material. Jacket 29 acts as a moderator for slowing down neutrons and will be more fully discussed hereinafter.

Outside moderator jacket 29, I provide a shield 12 surrounding the crystal 3. Shield 12 contains samarium or other materials, such as indium or gadolinium, that are characterized by large absorption cross section for very low-energy neutrons. In practice, it is most convenient to prepare shield 12 by dispersing samarium oxide or other suitable oxides in a plastic binder.

Surrounding photomultiplier 1 I provide an annular Permalloy shield 13, corresponding in structure and function to the shield 7 already described.

Externally of casing 50, but in the position corresponding to that of the crystal 3, I provide a relatively thick annular shield 11 made of cast nickel.

For cooperation with photomultiplier 1 I provide amplifier and power-supply unit 16, which provides the appropriate polarizing voltages for photomultiplier 1 and amplifies the power level of the output pulses therefrom. Amplifier 16, like amplifier 15, is arranged to provide positive output pulses. The output of amplifier 16 is applied to a gate circuit comprising a high-vacuum dual diode 18, having associated with it a polarizing battery 18a and a pulse transformer 18b, connected in a manner corresponding to the arrangement already described with respect to diode 17. Biasing voltage for the diode unit 18 is provided from the surface via wire 22 through isolating resistor 22a, output pulses from the pulse transformer 18b being transmitted to the surface via cable conductor 21.

As will be understood by persons skilled in the art, the conductors 21, 22, 23, and 24 are incorporated into the long cable 51 by means of which the logging instrument is lowered into the bore hole.

The cable 51 is shown in FIG. 2 as passing over a pulley 52, which provides a convenient means of determining the quantity of cable that has been unreeled and hence of determining the depth of the logging unit in the bore hole. Pulley 52 is mechanically linked to a reel 54 carrying a sensitized film 55. As the pulley 52 rotates, reel 54 rotates correspondingly, at some predetermined speed ratio, and hence causes successive parts of the film 55 to be exposed to light beams from the light sources 61 and 62. The light beams reach the film 55 by reflection from mirror galvanometers 63 and 64. The galvanometers, light sources, and film are of course all mounted in an enclosed housing.

It will be recalled that conductor 21 carries the pulses derived from the neutron detector via the diode unit 18, and conductor 22 supplies biasing voltage for diode 18. At the surface, the conductor 21 is connected to a frequency meter 65, a conventional device which is operative to produce a unidirectional output voltage proportional to the repetition rate of the pulses appearing between conductor 21 and ground. The output voltage of frequency meter 65 is applied to the winding of galvanometer 63 and the resulting current causes the mirror to assume angular positions at successive instants of time corresponding to the pulse frequency on conductor 21 at such moments. Thus the apparatus causes a record to be plotted on the film 55 which represents the pulse frequency derived from the neutron detector at each depth as the logging unit traverses the bore hole.

The conductor 22 may be connected at the surface to any suitable source of biasing voltage, such as battery 71 shunted by potentiometer 72, the positive terminal of the battery being grounded and the movable arm of the potentiometer being connected to conductor 22.

A similar arrangement involving frequency meter 75, galvanometer 64, battery 81, and potentiometer 82 is connected at the surface to conductors 23 and 24, for the purpose of providing on film 55 a continuous log, as a function of depth, of the frequency of pulses derived from the gamma-ray detector in the logging unit. The bias on the diode 17 is controlled by adjustment of potentiometer 82, in the manner just described with respect to diode 18.

In the operation of the logging unit of my invention, the gamma-ray detector is normally designed and adjusted to be selectively sensitive to gamma rays of energy in the neighborhood of 7 mev. To that end, the bias on the diode unit 17 will be appropriately adjusted so as to pass pulses of the amplitude experimentally determined to be characteristic of 7 mev. gamma rays.

The operation of the gate circuit comprising diode 17 is as follows: The negative bias provided on wire 24 maintains both diode plates at a negative potential, which effectively suppresses small pulses, since they do not cause either diode to conduct. Vary large pulses will drive both diode plates positive and will hence provide simultaneous currents, in opposite direction, in the primary winding of pulse transformer 17b. This results in cancellation, so that again no signal is produced on wire 23.

Pulses in the predetermined critical range, however, will cause one diode to conduct but will not raise the potential of the other diode plate sufficiently to pass current. As a result, current will flow in only one-half of the primary winding of pulse transformer 17b, no cancellation will occur, and an output pulse will be transmitted to the surface on conductor 23.

From the foregoing, it will be understood that the bias on diode 17, and the potential of battery 17a, can be adjusted to pass the pulses resulting from interaction of crystal 4 with gamma rays having energies in the neighborhood of 7 mev., which are characteristic of the gamma rays of capture emanated by chlorine.

It will also be appreciated from the foregoing description that the response characteristics of both the gamma-ray detector and the neutron detector can be altered by appropriate adjustment of the potentiometers 72 and 73 at the earth's surface, to make the respective gate circuits pass pulses characteristic of radiation in any desired energy levels within a wide range. Thus, the apparatus herein disclosed can be used for determining the presence of substances other than connate water, and logs primarily directed to the detection of such other substances can be run concurrently with a log directed to the detection of connate water, simply by appropriate adjustment of the potentiometers 72 and 82 for each of a plurality of depths, as the logging unit is moved vertically within the bore hole.

One source of inaccuracy in a log directed to the detection of connate water arises from the fact that sodium, on being irradiated with thermal neutrons, emits gamma rays of capture having energies in the neighborhood of 6.4 mev. Hence, if thermal neutrons are permitted to reach the sodium iodide crystal 4, interactions between the neutrons and the sodium atoms in the crystal will produce gamma rays lying in the same energy range as those reaching the crystal from chlorine reactions in the surrounding formations, selective detection of which is desired.

To prevent generation of such gamma rays of capture in the crystal 4 itself, therefore, I provide the boron shield 6 and the aluminum shield 5. The boron shield 6 will effectively absorb neutrons of thermal energy, but it will emit alpha particles as the result of such neutron absorption. The aluminum shield 5, however, will absorb the alpha particles without giving rise to any new radiation that will interfere with the accuracy of the gamma-ray log.

As will be understood from my previous remarks thereon, the accuracy spectral analysis of gamma rays accomplished by my logging unit is possible only because diffuser 27 substantially eliminates the error which would otherwise be introduced by non-uniformity of photo-sensitivity of the cathode of photomultiplier tube 2.

I have also found that the failure of previous efforts to achieve accurate spectral analysis of gamma rays of capture produced by neutron interaction with sodium and chlorine atoms in the formations surrounding a bore hole has been in considerable degree due to spurious gamma rays produced by interaction of thermal neutrons with atoms in the various devices which form a part of the logging unit itself. Such devices, which include the steel housing itself, the various metal parts therein included, electron tubes, etc., represent in all a very extensive assortment of elements, which, upon interaction with neutrons, will emit a broad gamma-ray spectrum including gamma rays in the desired energy zone around 7 mev. In the present invention, I have provided means to prevent the creation of such spurious gamma rays in the form of the shield 10, made of lead mixed with boron, completely surrounding the gamma-ray detector and situated outside the housing of the logging unit. Not only does this location of the shield 10 outside the logging unit prevent returning neutrons from entering the housing and interacting with atoms therewithin; it also has the highly desirable effect of displacing nearly all the drilling fluid in the zone directly opposite the gamma-ray detector. This further result is important in procuring an accurate spectral gamma-ray analysis, because the drilling fluid or mud often contains sodium chloride in significant amounts and other elements which, on interaction with neutrons, will emit gamma rays of capture in and around the 7 mev. energy range.

Still another beneficial result achieved by the external shield 10 is that it effectively bars from the gamma-ray detector the gamma rays of 2.2 mev. energy which originate from interaction of neutrons with hydrogen atoms. While the gate circuit comprising diode 17 is quite effective in preventing the pulses produced by such 2.2 mev. gamma rays from reaching the frequency meter 75, it is nonetheless desirable that those soft gamma rays be trapped out before they reach the crystal 4. Both the crystal 4 and the photomultiplier tube 2 have a finite recovery time following a flash before they are capable of transmitting another flash. Thus the presence of a strong field in the 2.2 mev. spectrum will "tie up" the crystal and photomultiplier for a substantial fraction of the total time and thereby reduce the probability of detecting gamma rays in the desired 7 mev. range.

The neutron detector comprising crystal 3 and photomultiplier 1 should for most applications be adjusted for optimum response to neutrons of about 1.5 ev. energy, although for some well-logging conditions it may be desirable to adjust for maximum response to neutrons of higher or lower energy.

The lithium iodide crystal 3, activated with tin or europium, responds to neutrons by reason of interactions between the neutrons and the lithium atoms of mass 6. The reaction may be written $Li_6 + n = H_3 +$ alpha particle. The alpha particles are highly ionizing and accordingly make the crystal scintillate.

The likelihood of the reaction is approximately inversely proportional to the neutron velocity, with the result that the crystal per se strongly favors thermal neutrons of extremely low energy—substantially less than .025 ev.

I have found, however, that neutrons returning from the formations with such low energy levels are not usually satisfactory for logging purposes, because their intensity is very much affected by such local effects as well diameter and the nature of the drilling fluid. Better logging results are obtained by measuring the intensity of the neutron flux in the neighborhood of 1.5 ev.

To accomplish that desirable result, I have provided means for making my neutron detector selectively responsive to such neutron flux. This means consists primarily of the samarium shield 12, in combination with the nylon moderator 29. The shield 12 effectively eliminates neutrons having less than about 1.5 ev. energy, and the nylon moderator 29 slows down the neutrons which penetrate shield 12 and reduces their energy to a point where they will produce, proportionately, a large number of nuclear interactions with the $Li_6$ atoms in the crystal 3.

Samarium is merely a preferred material for shield 12, other materials having a large capture cross section for low-energy neutrons being usable for that purpose. Examples of such materials are indium and gadolinium. Similarly, the moderator 29 may be formed from almost any suitable hydrogen-containing material, hard rubber and polystyrene being illustrative examples. Persons skilled in the art will be familiar with a great variety of other materials which will perform effectively as neutron moderators.

The function of Permalloy shield 13 in protecting the photomultiplier 1 from the effects of changes in the external magnetic fields has already been described.

The shield 11, preferably formed of cast nickel, sharply attenuates gamma rays returning from the formation, while offering no substantial opposition to passage of neutrons, and at the same time has the desirable effect of displacing nearly all the drilling fluid from the zone around the neutron detector. As with the gamma-ray detector already described, the drilling fluid, if not displaced, can produce local effects impairing seriously the accuracy of the log.

The cooling device 28, which will be described in greater detail presently, may be replaced by some other type of cooling arrangement. Indeed, in instances where the temperature of the well is not very high, the cooling device 28 can be replaced by a large block of material having high specific heat, such as, for example, a container filled with ice or cold water, or a block of lead or tantalum.

The details of the cooling unit 28 are shown in FIGS. 3 and 4. As will be noted from those figures, the container 28 is provided with an intermediate partition 28a having in the center thereof a pinhole aperture 28b. Partition 28a is placed so as to divide the container 28 into two chambers of unequal size, having no communication between them except via the pinhole 28b. The container 28 is mounted within the copper liner 8 in a position such that the smaller of the two chambers is uppermost when the logging unit is in a vertical position, both chambers being disposed side by side, as shown in FIG. 3, when the logging unit is in a horizontal position.

The two chambers in the unit 28 are somewhat less than half filled with substances which when brought together will undergo an endothermic or heat-absorbing process. A number of such processes are known to persons familiar with chemistry. For instance, the temperature of water can be substantially lowered by dissolving in it a salt, usually nitrate of ammonia. (See in that connection Mechanical Engineer's Handbook, edited by L. S. Marks, McGraw-Hill Books, Inc., 4th edition, New York, 1941, page 2138.)

When a logging unit is not in actual use in a well, it is normally stored in a horizontal position. Under such conditions, the reacting materials 28c and 28d are kept separate from one another, and no reaction occurs. When the unit is lowered into a well, however, the liquid material 28c finds itself disposed above the chamber containing the material 28c, so that a slow leakage through pinhole 28b can take place, the endothermic reaction proceeding slowly in the chamber containing the material 28d.

When the logging operation is completed, the unit will be restored to its normal horizontal position for storage, and the reaction between materials 28c and 28d will thereupon cease, since in the horizontal position communication through pinhole 28b is cut off.

This arrangement is greatly superior to the use of a refrigerant such as ice, since ice will melt whether the unit be in use or not, and hence must be supplied afresh before each logging operation. By proper choice of the size of container 28 and of the reacting materials 28c and 28d, on the other hand, a cooling means can be provided for my logging unit which will require attention only on rare occasions, since the cooling materials are not consumed or caused to change state during periods in which the unit is not actually in use in a logging operation.

While I have in this specification described in considerable detail a typical embodiment of my invention, it is to be understood that description is intended to be illustrative only. Many changes and variations therein may be made by persons skilled in the art without departing from the spirit of my invention.

I claim:

1. A bore-hole logging system comprising a logging unit adapted to be lowered into a bore hole, control apparatus situated externally of said bore hole, and an electric communication circuit interconnecting said logging unit and said control apparatus, said logging unit comprising detector means operative responsively to detected radiation to generate a train of electric pulses of non-uniform magnitude and a pulse-magnitude selector means fed by said pulse train for selectively transmitting a portion of said pulses, the selectivity of said selector means being variable responsively to changes in an electrical characteristic of said selector means, and means comprising at least a part of said communication circuit operative to change said electrical characteristic of said selector means in said logging unit responsively to actuation of said control apparatus externally of said bore hole.

2. A bore-hole logging system comprising a logging unit adapted to be lowered into a bore hole, control apparatus situated externally of said bore hole, and an electric communication circuit interconnecting said logging unit and said control apparatus, said logging unit comprising a radiation-sensitive detector means operative to generate electrical pulses of non-uniform magnitude responsively to radiation detected in said bore hole and a controllable pulse-magnitude selector means fed by said pulses and operative to transmit selectively the part of said pulses having magnitudes lying within a definite range, such range being subject to variation by change of an electrical characteristic of said selector means, and means comprising at least a part of said communication circuit interconnecting said control apparatus and said selector means in said logging unit operative on adjustment of said control apparatus to vary said electrical characteristic of said selector means, whereby said range may be adjusted while said logging unit is in a bore hole.

3. A bore-hole logging system comprising a logging unit adapted to be lowered into a bore hole for detection of radiation therein, control means situated at the earth's surface, and an electric cable interconnecting said unit and said control means, said logging unit comprising detector means operative responsively to detected radiation to generate a train of electric pulses of non-uniform magnitude and a pulse-magnitude selector means fed by said pulse train for selectively transmitting a portion of said pulses, the selectivity of said selector means being variable by changing an electrical characteristic of said selector means, and means comprising at least a part of said cable interconnecting said selector means and said control means operative to change said electrical characteristic of said selector means in said logging unit responsively to actuation of said control means at the earth's surface.

4. A bore-hole logging system comprising a logging unit adapted to be lowered into a bore hole, control apparatus situated externally of said bore hole, and an electric communication circuit interconnecting said logging unit and said control apparatus, said logging unit comprising detector means operative responsively to radiation detected in said bore hole to generate a train of electric pulses of non-uniform magnitude and a pulse-magnitude selector means fed by said pulse train for selectively transmitting a portion of said pulses, said selector means being characterized by variable selectively responsively to changes in a voltage applied thereto, and means for applying said voltage to said selector means for controlling the selectivity thereof, including at least a part of said control apparatus and at least a part of said communication circuit, operative to apply to said selector means a voltage adjustble to a selected one of plurality of values in response to adjustment of said control apparatus externally of said bore hole.

5. A bore-hole logging system comprising a logging unit adapted to be lowered into a bore hole, control means situated at the earth's surface, and an electric cable interconnecting said unit and said control means, said logging unit comprising a radiation detector operative responsively to radiation detected in said bore hole to generate a train of electric pulses of non-uniform magnitude and a controllable pulse-magnitude selector means fed by said pulses and operative to transmit selectively the part of said pulses having magnitudes lying within a definite range, at least one of the limits of such range being subject to control by variation of a voltage applied to said selector means, and means situated partly in said logging unit and partly at said control means and comprising at least a part of said cable, for controllably applying said voltage to said selector means, the magnitude of said voltage being variable by adjustment of said control means, whereby said range can be varied from said control means while said logging unit is in a bore hole.

6. A bore-hole logging system comprising a logging unit adapted to be lowered into a bore hole, control apparatus situated externally of said bore hole, and an electric communication circuit interconnecting said logging unit and said control apparatus, said logging unit comprising detecting means operative responsively to detected radiation to generate a train of electric pulses of non-uniform magnitude and a pulse-magnitude selector means fed by said pulse train for selectively transmitting a portion of said pulses, said selector means being characterized by variable selectivity controlled by electric signals applied thereto, and means including at least a part of said control unit and at least a part of said communication circuit operative to apply to said selector means electric signals for controlling said selectivity responsively to actuation of said control apparatus externally of said bore hole.

7. A bore-hole logging system comprising a logging unit adapted to be lowered into a bore hole, control means situated at the earth's surface, and an electric cable interconnecting said unit and said control means, said logging unit comprising a radiation detector operative responsively to radiation detected in said bore hole to generate a train of electric pulses of non-uniform magnitude and a controllable pulse-magnitude selector means fed by said pulses and operative to transmit selectively the part of said pulses having magnitudes lying within a definite range, at least one of the limits of such range being subject to control by electric signals applied to said selector means, and means situated partly in said logging unit and partly at said control means and comprising at least a part of said cable for applying electric signals to said selector means for adjusting such range responsively to actuation of said control means at the earth's surface.

8. A bore-hole logging system comprising a logging unit adapted to be lowered into a bore hole, control means situated externally of said bore hole, and an electric cable interconnecting said logging unit and said control means, said logging unit comprising a source of neutrons, a first radiation-responsive channel for producing a first train of electric pulses of non-uniform magnitude responsively to radiations induced by said neutron source and detected in said logging unit, a first pulse-magnitude selector means for selective transmission of a part of said first train of electric pulses, a second radiation-responsive channel in said logging unit for producing a second train of electric pulses of non-uniform magnitude responsively to other radiation detected in said logging unit, a second pulse-magnitude selector means for selective transmission of a part of said second train of electric pulses, and means comprising at least a part of said cable operable responsively to actuation of said control means for controlling the selectivity of at least one of said selector means by impressing electrical control current on said cable.

9. A bore-hole logging system comprising a logging unit adapted to be lowered into a bore hole, control means situated externally of said bore hole, and an electric cable interconnecting said logging unit and said control means, said logging unit comprising a source of neutrons, a first radiation-responsive channel for producing a first train of electric pulses of non-uniform magnitude responsively to radiations induced by said neutron source and detected in said logging unit, a first pulse-magnitude selector means for selective transmission of a part of said first train of electric pulses, a second radiation-responsive channel in said logging unit for producing a second train of electric pulses of non-uniform magnitude responsively to other radiation detected in said logging unit, a second pulse-magnitude selector means for selective transmission of a part of said second train of electric pulses, and means comprising at least a part of said cable operable responsively to actuation of said control means for controlling the selectivity of said first and second selector means by impressing first and second electrical control currents on said cable.

References Cited in the file of this patent

UNITED STATES PATENTS

| | | |
|---|---|---|
| 2,659,014 | Scherbatskoy | Nov. 10, 1953 |
| 2,686,268 | Martin et al. | Aug. 10, 1954 |
| 2,740,898 | Youmans | Apr. 3, 1956 |
| 2,778,947 | Scherbatskoy | Jan. 22, 1957 |
| 2,824,233 | Herzog | Feb. 18, 1958 |
| 2,888,568 | Jones et al. | May 26, 1959 |